(12) United States Patent
Byeon (10) Patent No.: US 11,008,967 B2
(45) Date of Patent: May 18, 2021

(54) APPARATUS AND METHOD FOR CONTROLLING ENGINE OF VEHICLE

(71) Applicants: HYUNDAI MOTOR COMPANY, Seoul (KR); KIA MOTORS CORPORATION, Seoul (KR)

(72) Inventor: Min Byeon, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/746,153

(22) Filed: Jan. 17, 2020

(65) Prior Publication Data

US 2021/0025345 A1 Jan. 28, 2021

(30) Foreign Application Priority Data

Jul. 26, 2019 (KR) .......................... 10-2019-0090851

(51) Int. Cl.
| | | |
|---|---|---|
| *F02D 41/18* | (2006.01) | |
| *F02P 5/15* | (2006.01) | |
| *F02D 41/04* | (2006.01) | |
| *F02D 41/30* | (2006.01) | |
| *F02D 41/00* | (2006.01) | |
| *F02P 5/04* | (2006.01) | |

(52) U.S. Cl.
CPC ......... *F02D 41/182* (2013.01); *F02D 41/009* (2013.01); *F02D 41/04* (2013.01); *F02D 41/3005* (2013.01); *F02P 5/045* (2013.01); *F02P 5/1502* (2013.01); *F02D 2200/0404* (2013.01); *F02D 2200/101* (2013.01)

(58) Field of Classification Search
CPC .... F02D 41/182; F02D 41/3005; F02D 41/04; F02D 41/009; F02D 2200/0404; F02D 2200/101; F02P 5/045; F02P 5/1502
USPC .... 123/406.23, 406.24, 406.52, 406.58, 436, 123/687, 399; 701/103–105, 110; 73/114.25, 114.31, 114.32
See application file for complete search history.

(56) References Cited

U.S. PATENT DOCUMENTS

2019/0063346 A1* 2/2019 Watanabe ........... F02D 41/0045

* cited by examiner

*Primary Examiner* — Hai H Huynh
(74) *Attorney, Agent, or Firm* — Brinks Gilson & Lione (57) ABSTRACT

A method for controlling an engine of a vehicle includes: monitoring, by a controller, engine operation data including a crank position and an engine rotation speed; obtaining, by the controller, a measured air amount flowing into to a specific cylinder; calculating, by the controller, an expected air amount at an intake valve closing time based on the measured air amount; calculating, by the controller, a fuel amount based on the expected air amount; calculating, by the controller, an ignition timing based on the engine rotation speed and the expected air amount; and injecting, by the controller, the calculated fuel amount and performing ignition at the ignition timing.

12 Claims, 6 Drawing Sheets

APPARATUS AND METHOD FOR CONTROLLING ENGINE OF VEHICLE

CROSS-REFERENCE TO RELATED APPLICATION

This application claims priority to and the benefit of Korean Patent Application No. 10-2019-0090851, filed on Jul. 26, 2019, the entire contents of which are incorporated herein by reference.

FIELD

The present disclosure relates to an apparatus and a method for controlling an engine of a vehicle.

BACKGROUND

The statements in this section merely provide background information related to the present disclosure and may not constitute prior art.

Generally, an engine is an apparatus that produces mechanical energy by compressing an air and fuel mixture and combusting the air and fuel mixture. For example, the combustion is triggered by a spark plug at a time called an ignition timing, and thereafter a firing propagates through the air and fuel mixture in a combustion chamber.

The ignition timing may be controlled according to various operation conditions of an engine, for example, to increase an output torque of an engine, and/or to decrease noxious gas in an exhaust gas. It is generally known that the ignition timing may be advanced to increase the output torque of the engine. However, knocking may occur while advancing the ignition timing is being advanced.

In order to prevent or minimize a disadvantage of the knocking, the ignition timing may be retarded when the knocking is detected. Alternatively, the advancing or retarding of the ignition timing may be controlled very slowly.

In the case that an accelerator pedal is depressed suddenly and rapidly by a driver, an intake air amount may accordingly vary suddenly and rapidly. In this case, knocking may occur due to sudden and rapid change of intake air amount when the ignition timing is controlled slowly, since the ignition timing may depend of the intake air amount.

The above information disclosed in this Background section is only for enhancement of understanding of the background of the present disclosure and therefore it may contain information that does not form the prior art that is already known to a person of ordinary skill in the art.

SUMMARY

The present disclosure provides an apparatus and method for controlling an engine of a vehicle that calculates an expected air amount to calculate an ignition timing.

An exemplary method for controlling an engine of a vehicle includes: monitoring, by a controller, engine operation data including a crank position and an engine rotation speed; obtaining, by the controller, a measured air amount flowing into a specific cylinder; calculating, by the controller, an expected air amount at an intake valve closing time based on the measured air amount calculating, by the controller, a fuel amount based on the expected air amount; calculating, by the controller, an ignition timing based on the engine rotation speed and the expected air amount; and injecting, by the controller, the calculated fuel amount and performing ignition at the ignition timing.

In one form, the obtaining of the measured air amount may be performed at a first time point that is a reference time point for identifying cylinders.

The calculating of the expected air amount may be performed at a second time point that is later than the first time point.

Furthermore, the calculating of the expected air amount may include: calculating a first air deviation amount based on a change rate of the measured air amount; calculating a second air deviation amount based on a change rate of a throttle opening; and calculating the expected air amount based on the first air deviation amount and the second air deviation amount.

In the calculating of the expected air amount, the first air deviation amount may be calculated as a deviation value expected from the first time point to the intake valve closing time according to the change rate of the measured air amount.

The ignition timing may be calculated by retrieving an ignition timing corresponding to the engine rotation speed and the expected air amount from a predetermined map table.

An exemplary apparatus for controlling an engine having a plurality of cylinders may include: an operation state detector configured to detect engine operation data including a crank position and an engine rotation speed; and a controller configured to receive the engine operation data from the operation state detector unit and to control the engine. The controller may be configured to: monitor the engine operation data, obtain a measured air amount with respect to a specific cylinder, calculate an expected air amount at an intake valve closing time based on the measured air amount, calculate a fuel amount based on the expected air amount, calculate an ignition timing based on the engine rotation speed and the expected air amount, inject the calculated fuel amount, and perform ignition at the calculated ignition timing.

According to an exemplary form, knocking may be prevented or significantly reduced by utilizing an expected air amount to calculate an ignition timing.

Furthermore, stability of operation, performance, and fuel consumption of the engine may be enhanced.

Other effects that may be obtained or are predicted by an exemplary form of the present disclosure will be explicitly or implicitly described in a detailed description of the present disclosure. That is, various effects that are predicted according to an exemplary form of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a method for controlling an engine of a vehicle according to an exemplary form of the present disclosure is described in detail with reference to the drawings. The drawings to be described below and the following detailed description relate to exemplary forms for explaining the characteristics of the present disclosure. Therefore, the present disclosure should not be construed as being limited to the drawings and the following description.

Further, in the description of exemplary forms of the present disclosure, the detailed description of related well-known configurations and functions is not provided when it is determined as unnecessarily making the scope of the present disclosure unclear. In addition, the terminologies to be described below are ones defined in consideration of their function in an exemplary form of the present disclosure and may be changed by the intention of a user, an operator, or a custom. Therefore, their definition should be made on the basis of the description of the present disclosure.

Further, in the following exemplary forms, the terminologies are appropriately changed, combined, or divided so that those skilled in the art can clearly understand them, in order to efficiently explain the main technical characteristics of the present disclosure, but the present disclosure is not limited thereto.

Hereinafter, exemplary forms of the present disclosure will be described in detail with reference to the accompanying drawings.

Figure 1:
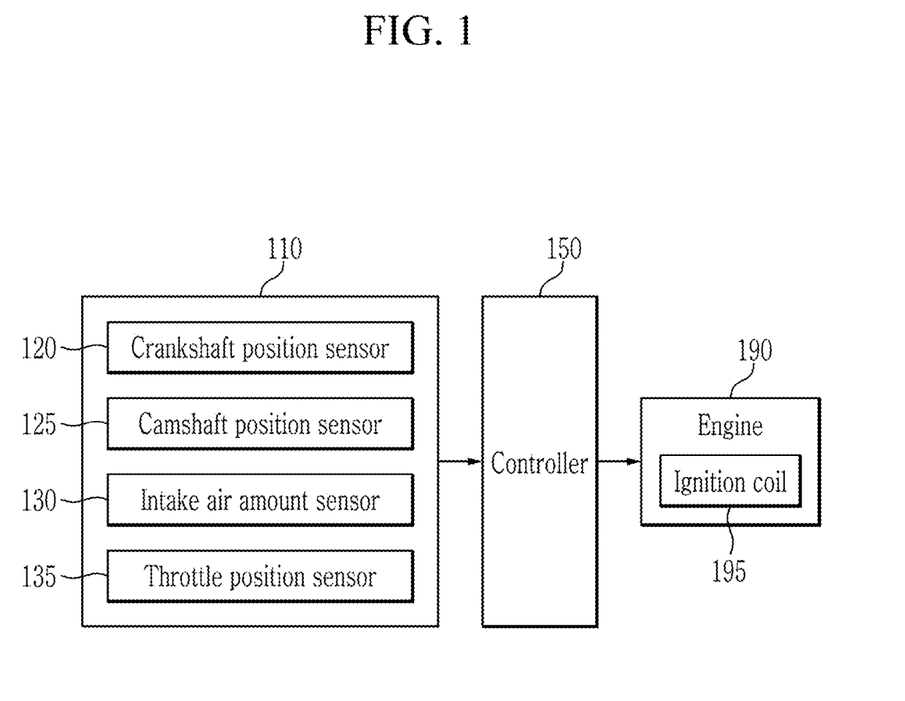
FIG. 1 is a schematic diagram illustrating an apparatus for controlling an engine of a vehicle according to an exemplary form of the present disclosure.
Figure 2A:
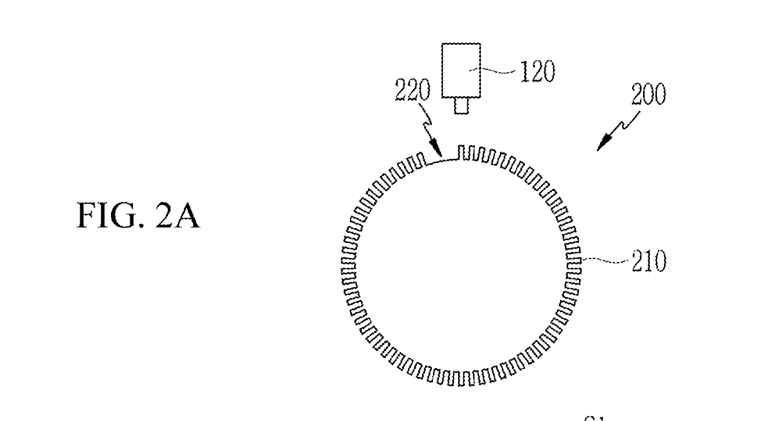
FIGS. 2A and 2B respectively illustrate a crankshaft position sensor and a signal generated by the crankshaft position sensor.
Figure 2B:
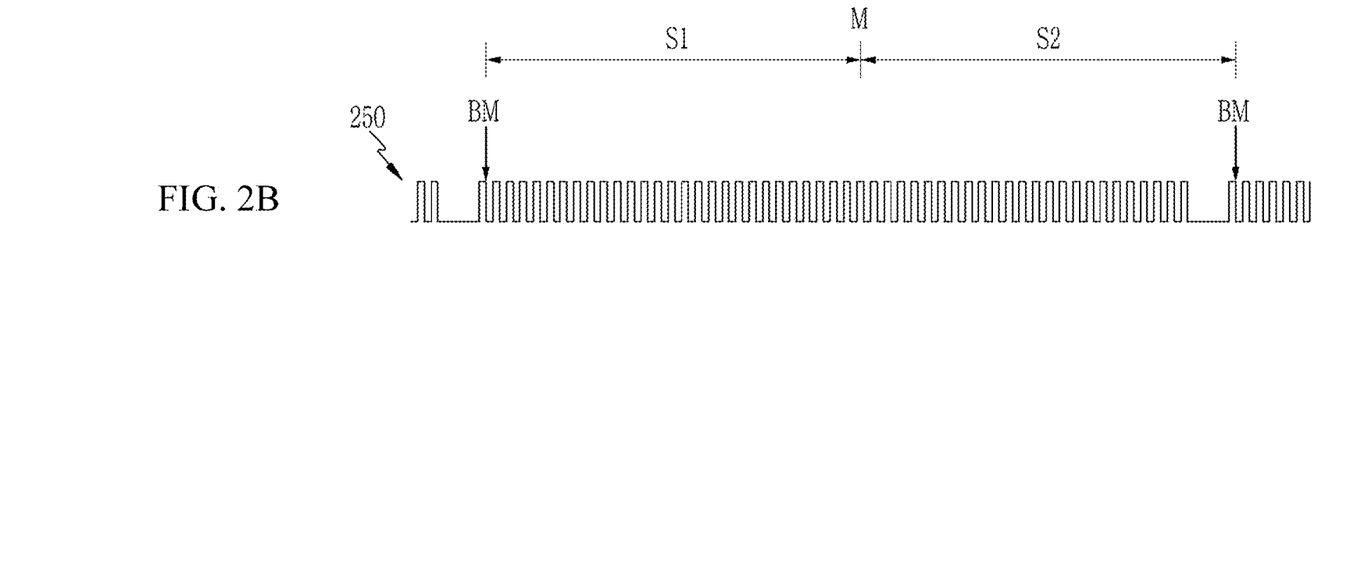

FIG. 1 is a schematic diagram illustrating an apparatus for controlling an engine of a vehicle according to an exemplary form of the present disclosure. FIGS. 2A and 2B respectively illustrate a crankshaft position sensor and a signal generated by the crankshaft position sensor.

Referring to FIG. 1, an apparatus for controlling an engine 190 of a vehicle includes a controller 150 and an operation state detector unit 110.

The operation state detector unit 110 detects various engine operation data for controlling the engine 190. For such purpose, the operation state detector unit 110 may include a crankshaft position sensor 120, a camshaft position sensor 125, an intake air amount sensor 130, and a throttle position sensor 135.

The crankshaft position sensor 120 detects a rotation angle of a crankshaft installed in the engine 190. As shown in FIG. 2A, the crankshaft may include a crankshaft wheel 200 that rotates with the crankshaft, and the crankshaft position sensor 120 may be arranged in the vicinity of the crankshaft wheel 200.

A plurality of teeth 220 may be formed on an external circumference of the crankshaft wheel 200. The plurality of teeth 220 are formed with a same size and spacing. A missing tooth 230 may be formed on the crankshaft wheel 200 to identify a reference angle of the crankshaft.

The crankshaft position sensor 120 may generate a pulse-shaped crank position signal 250 indicating a current position (i.e., rotation angle) of the crankshaft, and sends the crank position signal to the controller 150. The crank position signal 250 may be formed as shown in FIG. 2B. The reference symbol BM indicates a falling edge occurring immediately after the missing tooth as shown in FIG. 2B, and may be a reference mark for the controller 150 to identify cylinders. As shown in FIG. 2B, an angular interval between two adjacent reference marks BM may be 360 degrees, and the interval may include first and second segments S1 and S2.

The controller 150 may determine corresponding stroke of respective cylinders based on the position of the reference mark BM.

The camshaft position sensor 125 may generate a cam position signal by detecting a rotation angle of a camshaft included in the engine 190, e.g., with respect to a cam edge. The camshaft may operate opening and closing of intake valves and exhaust valves in the engine 190. The camshaft may generally rotate synchronously with the crankshaft, e.g., in a half rotation speed of the crankshaft. However, it may be understood that the rotation of the camshaft may not be exactly synchronous with the rotation of the crankshaft, in the case that a variable valve timing device is employed.

The camshaft position sensor 125 sends the cam position signal to the controller 150.

Based on the crank position signal and/or the cam position signal, the controller 150 may determine, for respective cylinders, crank angles such as top dead center (TDC) and bottom dead center (BDC) and valve timings such as valve opening time and valve closing time of intake valves and exhaust valves.

The intake air amount sensor 130 detects an intake air amount drawn to the engine 190, and generates and sends an intake air amount signal to the controller 150. The intake air amount sensor 130 may be an air flow sensor.

The throttle position sensor 135 detects a throttle opening of a throttle valve of the engine 190 that controls the intake air amount, and sends a throttle opening signal to the controller 150.

Although It has been described that the operation state detector unit 110 includes the crankshaft position sensor 120, the camshaft position sensor 125, the intake air amount sensor 130, and the throttle position sensor 135, the present disclosure is not limited thereto. It may be understood that the operation state detector unit 110 may additionally include one or more sensors, such as a coolant temperature sensor, a vehicle speed sensor, a brake pedal sensor, an accelerator pedal sensor.

The controller 150 collects engine operation data from the operation state detector unit 110, and controls the engine 190 based on the engine operation data obtained from the operation state detector unit 110.

In more detail, the controller 150 may obtain an engine speed based on the crank position signal, and may obtain a measured air amount from the intake air amount sensor 130, for respective cylinders. For a specific cylinder, the controller 150 may calculate an expected air amount based on the measured air amount. The expected air amount may be, e.g., a value expected at an intake valve closing (IVC) time of the specific cylinder, while the calculation of the expected air amount may be performed prior to the IVC time of the specific cylinder. The measured air mount may be, e.g., a measured air amount for an immediately previous intake stroke of the specific cylinder, or a measured air amount for an intake stroke of a cylinder that has experienced an intake stroke immediately previously. Based on the calculated expected air amount, the controller 150 may calculate an appropriate fuel injection amount and ignition timing. Based on the calculated fuel injection amount and ignition timing, the controller 150 controls the engine.

The controller 150 may be implemented as at least one microprocessor operating by a predetermined program, and the predetermined program may include instructions for executing a method for controlling an engine of a vehicle according to an exemplary form of the present disclosure. The controller 150 may be an electronic unit that is typically called an engine control unit (ECU) or an engine management system (EMS).

A method for controlling an engine of a vehicle will be described in more detail with reference to FIG. 3 to FIG. 5.

The engine 190 transforms a chemical energy of the fuel to a mechanical energy, by combustion of the fuel with the air. The engine 190 is operated under the control of the controller 150.

The ignition coil 195 is activated by the controller 150 to form a spark ignition at the ignition timing, so as to trigger combustion of the air/fuel mixture in the cylinder.

An exemplary method for controlling the engine 190 of the vehicle is hereinafter described in detail with reference to FIG. 3 to FIG. 5.

Figure 3:
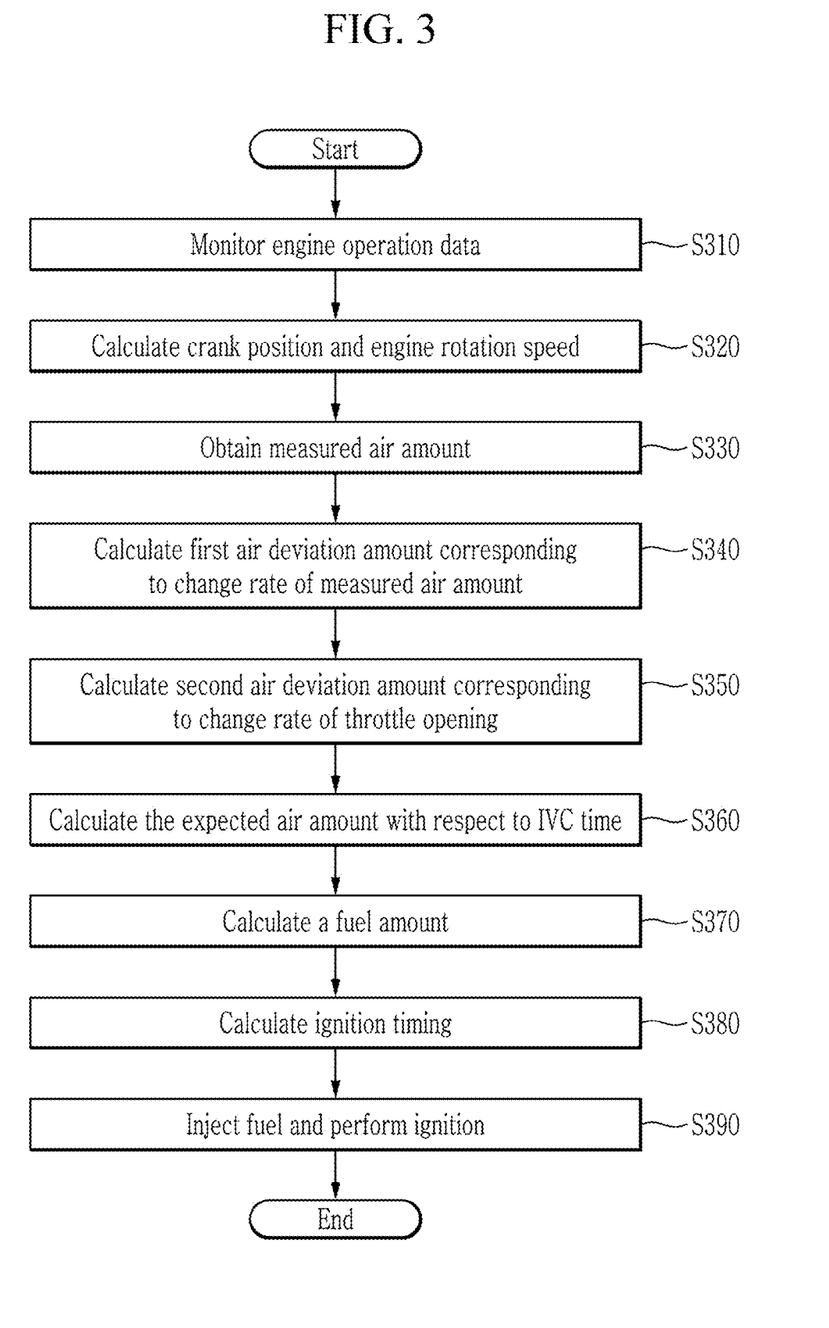
FIG. 3 is a flowchart showing a method for controlling an engine of a vehicle according to an exemplary form of the present disclosure.

FIG. 3 is a flowchart showing a method for controlling an engine of a vehicle according to an exemplary form of the present disclosure. FIG. 4 is a diagram illustrating a method for controlling an engine of a vehicle according to an exemplary form of the present disclosure.

Figure 4:
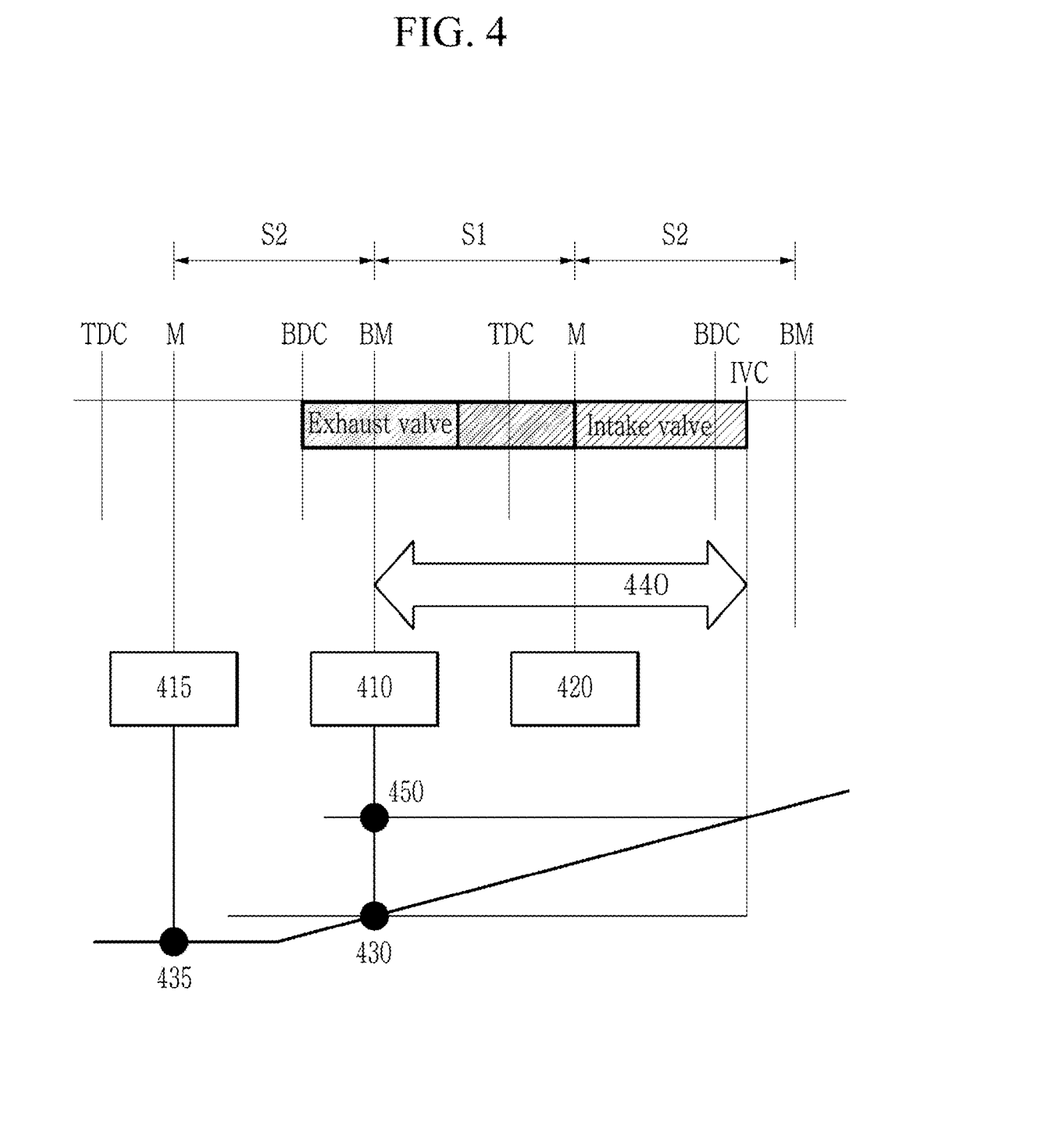
FIG. 4 is a diagram illustrating a method for controlling an engine of a vehicle according to an exemplary form of the present disclosure.

Referring to FIG. 4, one cycle (i.e., 360 degrees between adjacent points of BM) in the crank position may be divided into two segments S1 and S2 having a middle time point M, and the intake air amount is obtained every point of the time point BM and M.

Referring to FIG. 3, at step S310, the controller 150 monitors engine operation data to control the engine 190.

In more detail, the crankshaft position sensor 120 of the operation state detector unit 110 detects the rotation angle of the crankshaft, and provides a crank position signal representing the detected rotation angle of the crankshaft (i.e., crank position) to the controller 150. The camshaft position sensor 125 of the operation state detector unit 110 may detect the rotation angle of the camshaft, and provides a cam position signal representing the rotation angle of the camshaft (i.e., cam position) to the controller 150. The intake air amount sensor 130 of the operation state detector unit 110 detects an intake air amount drawn to the cylinder, and provides an intake air amount detection signal representing the intake air amount to the controller 150. The throttle position sensor 135 of the operation state detector unit 110 detects the throttle opening of the throttle valve, and provides a throttle opening signal representing the throttle opening to the controller 150.

The crank position, the cam position, the intake air amount, and the throttle opening are continuously detected by the operation detector unit 110, and the controller 150 may continuously monitor the detected values during operation of the engine.

Subsequently at step S320, the controller 150 calculates the engine rotation speed based on the engine operation data.

The controller 150 may calculate the engine rotation speed based on angular changes in the crank position signal and the cam position signal. In addition, the controller 150 may calculate the crank position, with respect to respective cylinders, based on the crank position signal and the cam position signal.

At step S330, the controller 150 may obtain a currently measured air mount based on the engine operation data.

For example, at a first time point 410 in FIG. 4, the controller 150 may obtain the currently measured air amount 430 from the intake air amount detection signal included in the engine operation data, in order to control fuel injection and ignition timing of a specific cylinder, for example, a cylinder of which an exhaust valve is open at the first time point 410. The first time point 410 may be set as the crank position corresponding to the reference mark BM.

Then, at step S340, the controller 150 calculates a first air deviation amount corresponding to a change rate in the measured air amount.

It may be understood that the air amount drawn to the engine may vary time-dependently, and the change rate may be determined between two consecutive time points. Thus, the change rate in the measured air amount at the first time point 410 may be calculated based on a difference between two consecutive measured air amounts around the first time point 410. In one form, the two consecutive time points may be the first time point 410 and a previous time point 415 as shown in FIG. 4.

Referring to FIG. 4, when a previously measured air amount 435 measured at the previous time point 415 and the currently measured air amount 430 measured at the time point 410 show a difference, this means the actual air amount drawn to the engine is varying, and the change rate of the measured air amount at the first time point 410 may be calculated. Thus, the controller 150 may calculate the first air deviation based on the change rate of the measured air amount occurring at the first time point 410. The first air deviation may be calculated with respect to the time point IVC time, that is, as a deviation value expected from the first time point 410 to the time point IVC time according to the change rate of the measured air amount 435.

Thus, it may be understood that an actual intake air amount expected at the IVC time taking into account of the change rate of the measured air amount may be calculated by adding the first air deviation amount to the currently measured air amount.

It has been described above that the previously measured air amount may be one measured at the previous time point 415. In this case, the previously measured air amount 435 measured at a previous time point 415 may be an intake air amount measured for a previous cylinder according to a firing order of the engine 190. For example, when the specific cylinder handled at the time point 410 is cylinder number 3 of the engine 190 while the firing order of the engine 190 is 1-3-4-2, the previously measured air amount 435 measured at the previous time point 415 may be one measured for handling cylinder number 1.

At step S350, the controller 150 calculates a second air deviation amount in order to take into account of a change of a throttle opening of a throttle valve of the engine 190.

As described above, the throttle opening of the throttle valve of the engine 190 is detected by the throttle position sensor 135 and the throttle opening signal is received by the controller 150. At the first time point 410, the controller 150 may calculate a change rate of the throttle opening during a predetermined period (e.g., 10 ms) based on the throttle opening signal, and calculate the second air deviation amount based on the change rate of the throttle opening. It may be understood that a driver's operation of the throttle valve at the first time point 410 may affect the actual intake air amount drawn to the engine expected at the IVC time. That is, when the throttle opening is increasing at the first time point 410, the actual intake air amount at the IVC time may be expected greater than one expected when the throttle opening is maintained. When the throttle opening is decreasing at the first time point 410, the actual intake air amount at the IVC time may be expected smaller than one expected when the throttle opening is maintained. Specific values of the second air deviation amount corresponding to the change rate of the throttle opening may be stored as a map table, and the controller 150 may retrieve a corresponding value from the map table based on the change rate of the throttle opening.

At step S360, the controller 150 calculates the expected air amount based on the measured air amount, the first air deviation amount, and the second air deviation amount.

As described above, the measure air amount may be measured at the first time point 410. The first and second air deviation amounts may be calculated at a second time point 420, or immediately after detecting the measured air amount. The second time point 420 may be a time point M between the time point BM 410 and the subsequent BM, and may be an exhaust valve closing (EVC) time of the specific cylinder that is currently handled. The first air deviation amount may be calculated with respect to the IVC time, based on the change rate of the measured air amount. The second air deviation amount may be calculated with respect to the IVC time, based on the change rate of the throttle opening. The expected air amount may be calculated by summing the measured air amount, the first air deviation amount, and the second air deviation amount, and as a result, the expected air amount may be obtained as indicated by reference numeral 450 in FIG. 4.

At step S370, the controller 150 calculates a fuel amount to inject into the engine 190 based on the expected air amount. The step 370 may be performed at the time M, e.g., the EVC time of the specific cylinder that is handled.

At step S380, the controller 150 calculates an ignition timing based on the engine rotation speed and the expected air amount.

The step 380 may be performed at the time M, e.g., the EVC time of the specific cylinder that is handled.

The ignition timing corresponding to engine rotation speed and the expected air amount may be retrieved from a predetermined ignition map that stores predetermined values of ignition timings corresponding to the engine rotation speeds and intake air amounts.

At step S390, the controller 150 controls the engine 190 to inject the calculated fuel amount and performs ignition at the calculated ignition timing.

Figure 5A:
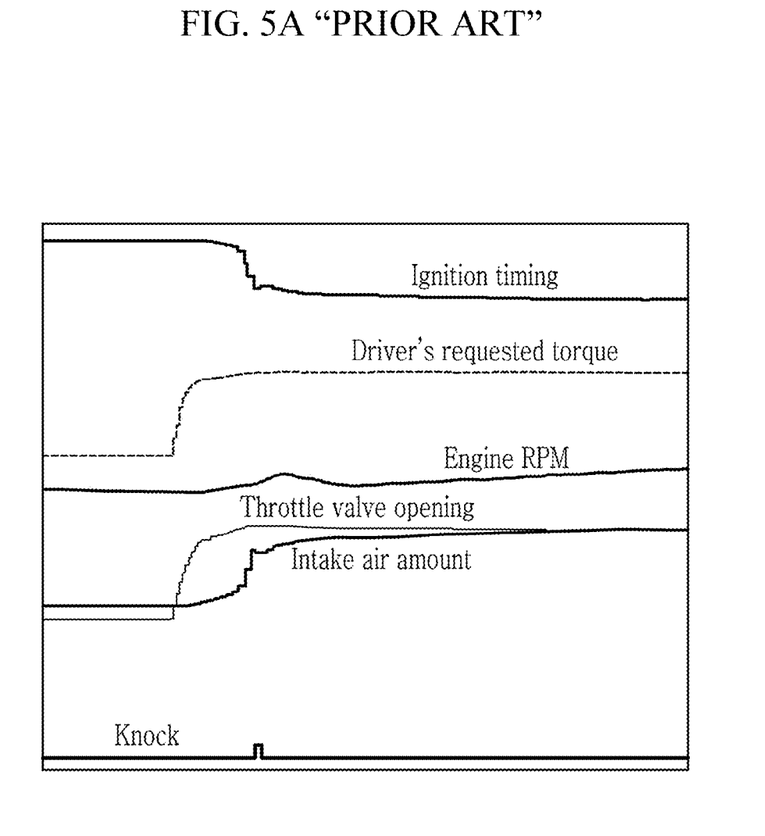
FIG. 5A is a diagram illustrating a knocking when a conventional scheme for controlling an engine of a vehicle is applied.
Figure 5B:
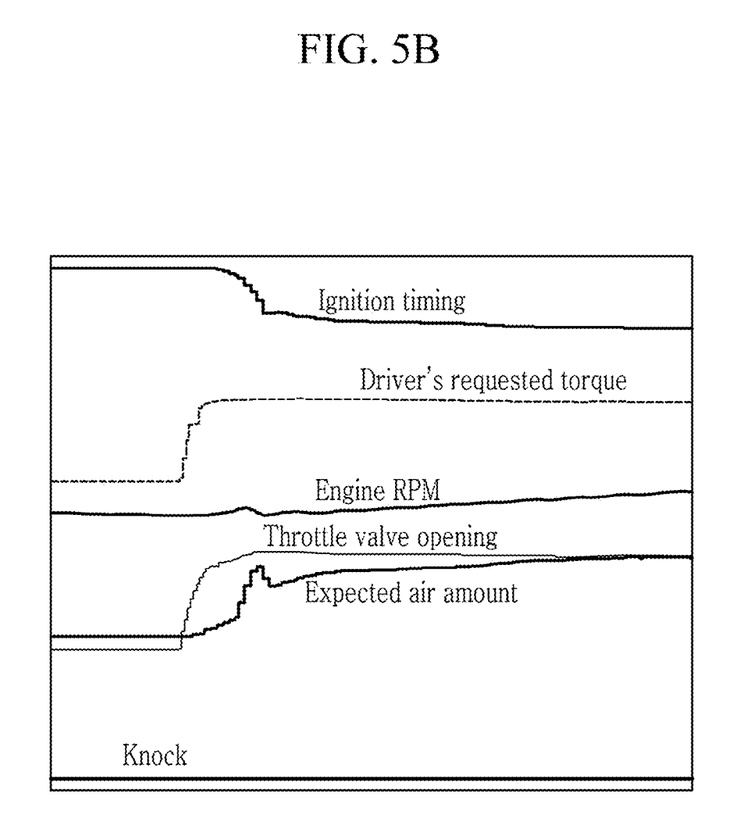
FIG. 5B illustrates an effect of an exemplary method for controlling an engine of a vehicle to inhibit knocking.

FIGS. 5A and 5B illustrates an effect of preventing knocking according to an exemplary method for controlling an engine of a vehicle in comparison with a conventional scheme.

As shown in FIG. 5A, according to a conventional scheme that utilizes measured air amount to calculate the fuel amount and/or the ignition timing, knocking may occur when an actual air amount abruptly changes by an abrupt change of throttle opening, e.g., by a driver's abrupt operation of the accelerator pedal. This may be because the value of intake air amount used for calculating the fuel amount and the ignition timing may not sufficiently rapidly follow an actual intake air amount.

However, according to an apparatus for controlling an engine of a vehicle, as shown in FIG. 5B, an expected air amount is calculated by expecting an actual intake air amount at the time point of intake valve closing, and a fuel amount and ignition timing is calculated based on the expected air amount. By such a configuration, as shown in FIG. 5B, the expected air amount may become sufficiently close to the actual intake air amount to prevent knocking when a strong acceleration is abruptly requested by a driver. Thus, stability of operation, performance, and fuel consumption of the engine may be enhanced.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the appended claims.

DESCRIPTION OF SYMBOLS

110: operation state detector unit
120: crankshaft position sensor
125: camshaft position sensor
130: intake air amount sensor
135: throttle position sensor
150: controller
190: engine
200: crankshaft wheel
210: tooth
220: missing tooth

What is claimed is:

1. A method for controlling an engine of a vehicle, the method comprising:
    monitoring, by a controller, engine operation data including a crank position and an engine rotation speed;
    obtaining, by the controller, a measured air amount flowing into a specific cylinder;
    calculating, by the controller, an expected air amount at an intake valve closing time based on the measured air amount;
    calculating, by the controller, a fuel amount based on the expected air amount;
    calculating, by the controller, an ignition timing based on the engine rotation speed and the expected air amount; and
    injecting, by the controller, the calculated fuel amount and performing ignition at the ignition timing,
    wherein calculating the expected air amount comprises:
        calculating a first air deviation amount based on a change rate of the measured air amount;
        calculating a second air deviation amount based on a change rate of a throttle opening; and
        calculating the expected air amount based on the first air deviation amount and the second air deviation amount.

2. The method of claim 1, wherein obtaining the measured air amount is performed at a first time point that is a reference time point for identifying cylinders.

3. The method of claim 2, wherein calculating the expected air amount is performed at a second time point that is later than the first time point.

4. The method of claim 1, wherein, in calculating the expected air amount, the first air deviation amount is calculated as a deviation value expected from a first time point to the intake valve closing time based on the change rate of the measured air amount.

5. The method of claim 1, wherein the ignition timing is calculated by retrieving an ignition timing corresponding to the engine rotation speed and the expected air amount from a predetermined map table.

6. An apparatus for controlling an engine having a plurality of cylinders, the apparatus comprising:
   an operation state detector configured to detect engine operation data including a crank position and an engine rotation speed; and
   a controller configured to receive the engine operation data from the operation state detector and control the engine,
   wherein the controller is configured to:
      monitor the engine operation data,
      obtain a measured air amount with respect to a specific cylinder,
      calculate an expected air amount at an intake valve closing time based on the measured air amount,
      calculate a fuel amount based on the expected air amount,
      calculate an ignition timing based on the engine rotation speed and the expected air amount,
      inject the calculated fuel amount,
      perform ignition at the calculated ignition timing,
      calculate a first air deviation amount based on a change rate of the measured air amount,
      calculate a second air deviation amount based on a change rate of a throttle opening, and
      calculate the expected air amount based on the measured air amount and the first and second air deviation amounts.

7. The apparatus of claim 6, wherein the operation state detector comprises:
   a crankshaft position sensor configured to detect the crank position of a crankshaft of the engine and send a crank position signal;
   a camshaft position sensor configured to detect a cam position of a camshaft of the engine and send a cam position signal; and
   an intake air amount sensor configured to measure an intake air amount drawn into the engine.

8. The apparatus of claim 7, wherein the controller is configured to calculate the crank position, with respect to respective cylinders, based on the crank position signal and the cam position signal.

9. The apparatus of claim 7, wherein:
   the controller is configured to obtain the measured intake air amount at a first time point by the intake air amount sensor; and
   the controller is configured to calculate the expected air amount that is expected at an intake valve closing time based on the measured intake air amount.

10. The apparatus of claim 9, wherein the first time point is a reference time point for identifying cylinders.

11. The apparatus of claim 6, wherein the controller is configured to calculate the expected air amount as a sum of the measured air amount, the first air deviation amount, and the second air deviation amount.

12. The apparatus of claim 6, wherein the controller is configured to calculate the ignition timing by retrieving an ignition timing corresponding to the engine rotation speed and the expected air amount from a predetermined map table.

* * * * *